US009747585B2

(12) United States Patent
Eleid et al.

(10) Patent No.: US 9,747,585 B2
(45) Date of Patent: Aug. 29, 2017

(54) METHOD OF RETRIEVING AND UNIFORMALIZING ELEVATOR MAINTENANCE AND CALLBACK DATA AND CODE EVENTS

(71) Applicant: Xicore Inc., Mississauga (CA)

(72) Inventors: Ray Eleid, Mississauga (CA); Fransky Halim, Mississauga (CA)

(73) Assignee: Xicore Inc., Mississauga (CA)

( * ) Notice: Subject to any disclaimer, the term of this patent is extended or adjusted under 35 U.S.C. 154(b) by 477 days.

(21) Appl. No.: 14/514,260

(22) Filed: Oct. 14, 2014

(65) Prior Publication Data

US 2016/0104126 A1 Apr. 14, 2016

(51) Int. Cl.
*B66B 1/28* (2006.01)
*G06Q 10/00* (2012.01)

(52) U.S. Cl.
CPC .................................... *G06Q 10/20* (2013.01)

(58) Field of Classification Search
CPC ...................................................... G06Q 10/20
USPC ........ 187/247, 391, 393; 705/1.1, 13, 26.61, 705/304, 305, 34; 709/220, 222, 224, 709/234; 702/183, 184; 706/910
See application file for complete search history.

(56) References Cited

U.S. PATENT DOCUMENTS

| | | | | |
|---|---|---|---|---|
| 5,884,035 A * | 3/1999 | Butman | G06F 17/3089 | 707/999.01 |
| 6,330,936 B1 * | 12/2001 | Lence Barreiro | B66B 5/0025 | 187/247 |
| 7,417,726 B2 * | 8/2008 | Kao | B01L 3/50851 | 356/243.1 |
| 9,064,219 B2 * | 6/2015 | Hall | G06Q 10/06 | |
| 2004/0193518 A1 * | 9/2004 | Deplazes | B66B 5/0025 | 705/34 |
| 2010/0058248 A1 * | 3/2010 | Park | G06F 3/0481 | 715/851 |
| 2010/0286937 A1 * | 11/2010 | Hedley | G06Q 30/02 | 702/60 |
| 2012/0072356 A1 * | 3/2012 | Welty | G06Q 10/20 | 705/305 |
| 2013/0073260 A1 * | 3/2013 | Maeda | G05B 23/0224 | 702/183 |
| 2013/0173062 A1 * | 7/2013 | Koenig-Richardson | G06Q 10/00 | 700/275 |

(Continued)

*Primary Examiner* — Anthony Salata
(74) *Attorney, Agent, or Firm* — Wilfred P. So; Blake, Cassels & Graydon LLP

(57) ABSTRACT

Elevators and escalators produce code event data, and also have associated maintenance data and callback data. This data is collected and stored in different formats for different types of elevators and escalators, as well as their respective controller devices. Systems and methods are provided that include elevator controllers that transmit code events to a business partner by means of a web services application. The code events data comprising elevator performance data that is collected and stored by the elevator controllers in different formats, and the different formats correspond to different types of the elevator controllers. The business partner obtains the code events data, uniformalizes the code events data, and presents the code events data by means of a web application. Other user devices, via a mobile web application, can access the uniformalized data and, initiate and control callbacks for a given elevator.

27 Claims, 18 Drawing Sheets

(56) References Cited

U.S. PATENT DOCUMENTS

| | | | | |
|---|---|---|---|---|
| 2014/0229335 | A1* | 8/2014 | Chen .................. | G06Q 30/0269 705/26.61 |
| 2016/0010313 | A1* | 1/2016 | Sugiura ............... | B60R 16/0234 701/29.4 |
| 2016/0012707 | A1* | 1/2016 | McKinley .............. | G08B 25/10 340/679 |
| 2016/0171455 | A1* | 6/2016 | Eleid ...................... | G06Q 10/20 705/305 |

* cited by examiner

3-3_activities

| Column Name | Data Type |
|---|---|
| activity_id —— 102 | int |
| company_id —— 104 | int |
| location_id —— 106 | int |
| device_id —— 108 | int |
| activity_type | varchar(30) |
| work_description —— 110 | varchar(250) |
| repair_description —— 112 | varchar(250) |
| entered_date —— 114 | smalldatetime |
| completed_date —— 116 | smalldatetime |
| work_order_number | varchar(20) |
| invoice_number —— 120 | varchar(20) |
| estimated_cost —— 122 | decimal(10,...) |
| actual_cost —— 124 | decimal(10,...) |
| callback_id —— 123 | int |
| directive_code —— 125 | varchar(10) |
| deficiency_number —— 126 | varchar(20) |
| government_mandated_code | varchar(10) |
| counter —— 128 | int — 127 |
| billable —— 129 | bit |
| deleted | bit |
| deleted_by | int |
| deleted_when | smalldatetime |
| timeID | int |
| ContractID | int |

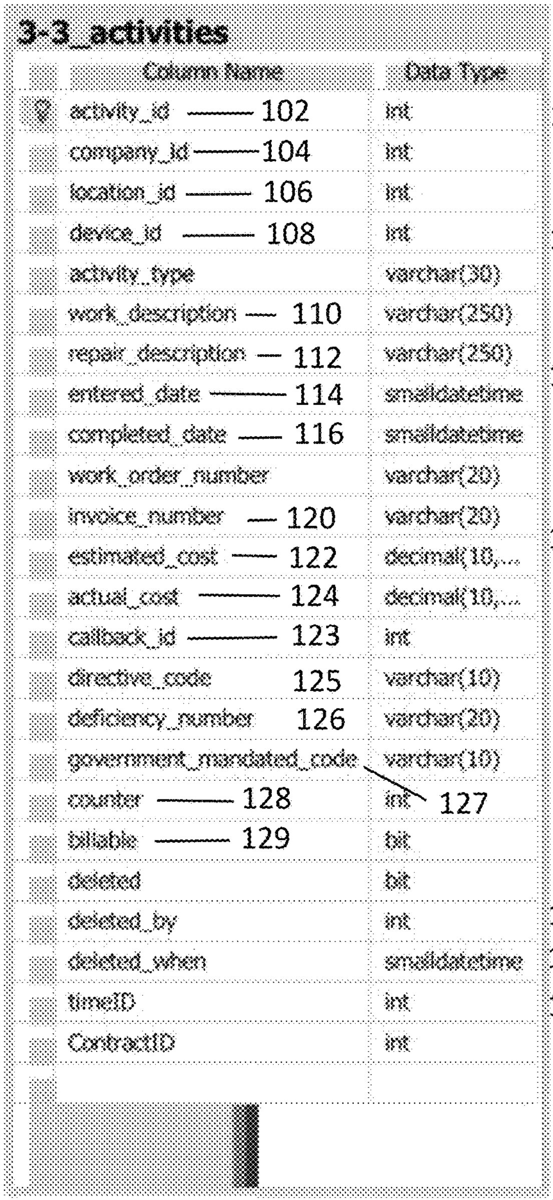

Fig. 6a

3-3_activity_labour

| Column Name | Data Type |
|---|---|
| 130 — activity_labour_id | int |
| activity_id —— 102 | int |
| mechanic —— 132 | varchar(50) |
| 134 — time_ticket_number | varchar(20) |
| mechanic_rank | varchar(10) |
| bill_regular_hour | decimal(6, 2) |
| bill_half_hour | decimal(6, 2) |
| 136 — bill_overtime_hour | decimal(6, 2) |
| bill_travel_time | decimal(6, 2) |
| nonbill_regular_hour | decimal(8, 1) |
| nonbill_half_hour | decimal(8, 1) |
| 138 — nonbill_overtime_h... | decimal(8, 1) |
| nonbill_travel_time | decimal(8, 1) |
| activity_performed | varchar(250) |

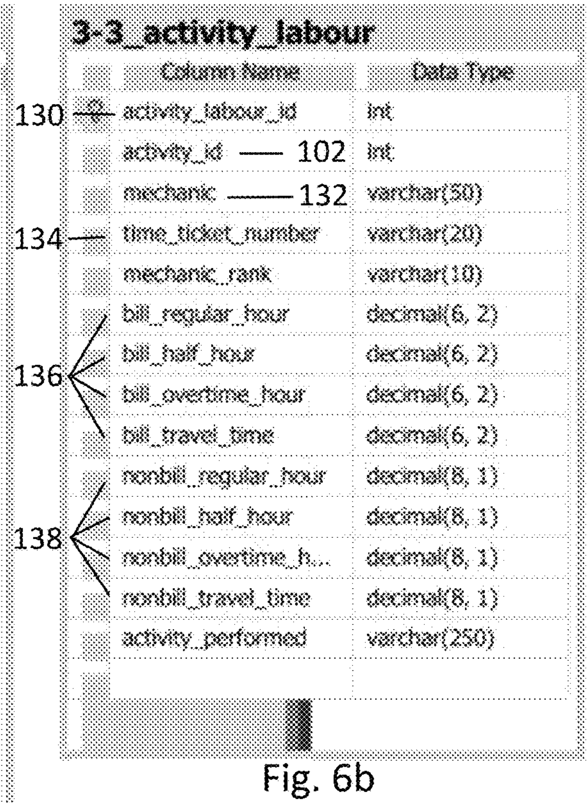

Fig. 6b

3-3_activity_parts

| Column Name | Data Type |
|---|---|
| 140 — activity_part_id | int |
| 130 — activity_labour_id | int |
| 102 — activity_id | int |
| SKU —— 142 | varchar(30) |
| OEM —— 144 | varchar(30) |
| non_OEM | varchar(30) |
| name —— 146 | varchar(50) |
| 148 — manufacturer | varchar(50) |
| 150 — quantity | smallint |
| 152 — description | varchar(100) |
| billable | bit |
| price —— 154 | decimal(8, 2) |

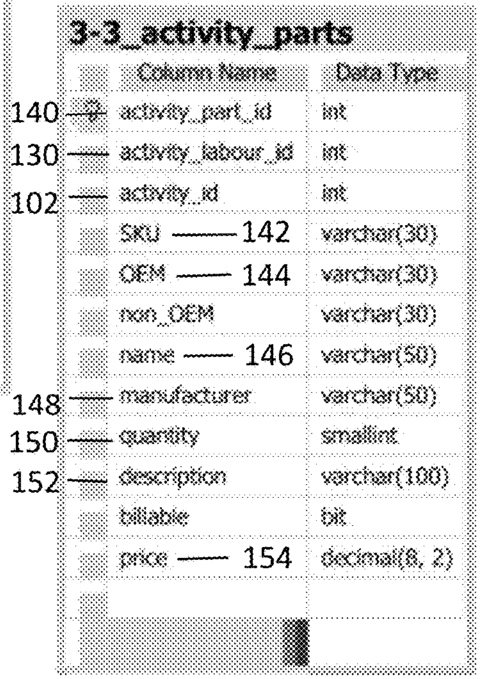

Fig. 6c

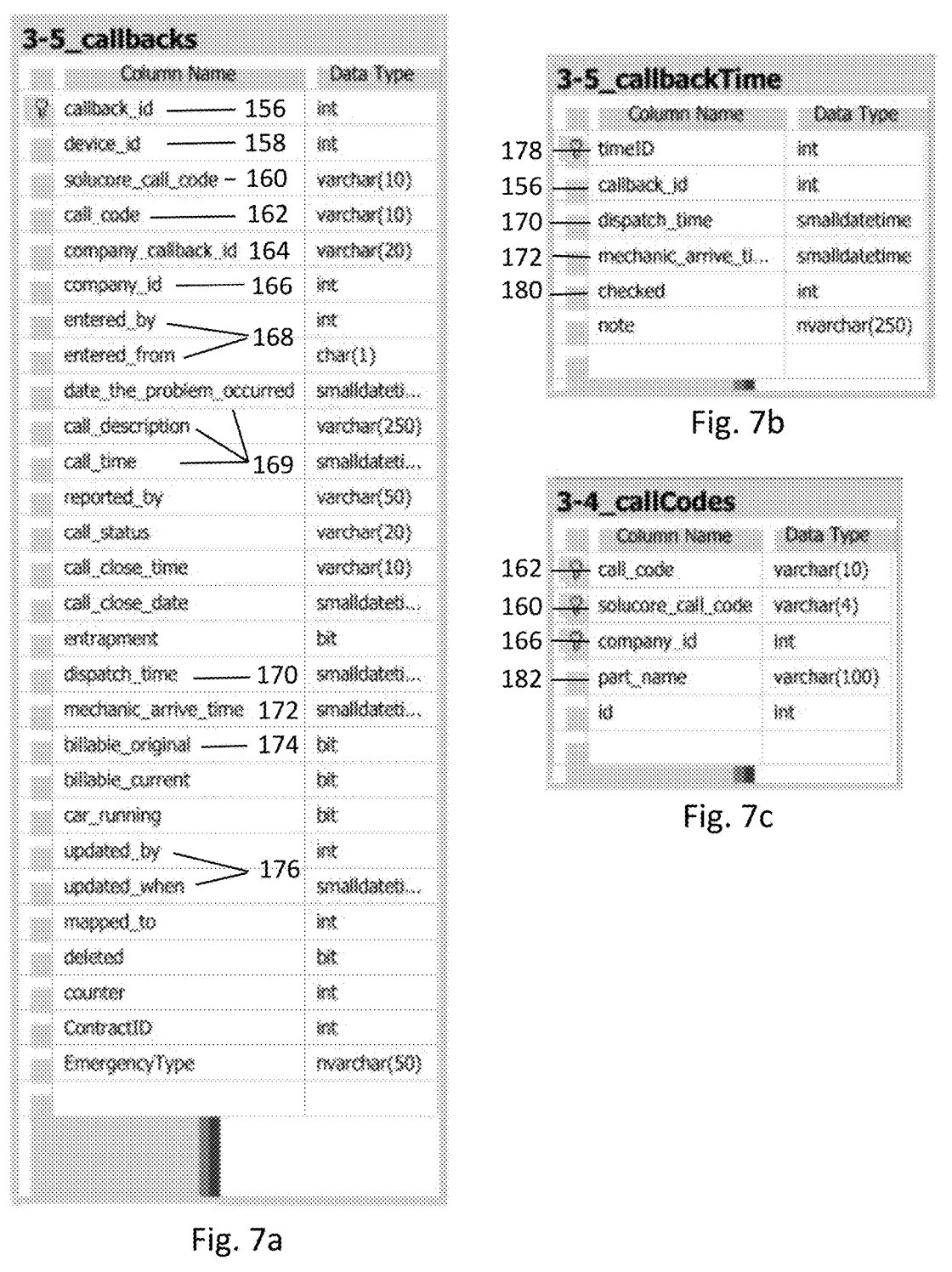

3-5_callbacks

| Ref. | Column Name | Data Type |
|---|---|---|
| 156 | callback_id | int |
| 158 | device_id | int |
| 160 | solucore_call_code | varchar(10) |
| 162 | call_code | varchar(10) |
| 164 | company_callback_id | varchar(20) |
| 166 | company_id | int |
| 168 | entered_by | int |
| 168 | entered_from | char(1) |
| | date_the_problem_occurred | smalldateti... |
| 169 | call_description | varchar(250) |
| 169 | call_time | smalldateti... |
| | reported_by | varchar(50) |
| | call_status | varchar(20) |
| | call_close_time | varchar(10) |
| | call_close_date | smalldateti... |
| | entrapment | bit |
| 170 | dispatch_time | smalldateti... |
| 172 | mechanic_arrive_time | smalldateti... |
| 174 | billable_original | bit |
| | billable_current | bit |
| | car_running | bit |
| 176 | updated_by | int |
| 176 | updated_when | smalldateti... |
| | mapped_to | int |
| | deleted | bit |
| | counter | int |
| | ContractID | int |
| | EmergencyType | nvarchar(50) |

Fig. 7a

3-5_callbackTime

| Ref. | Column Name | Data Type |
|---|---|---|
| 178 | timeID | int |
| 156 | callback_id | int |
| 170 | dispatch_time | smalldatetime |
| 172 | mechanic_arrive_ti... | smalldatetime |
| 180 | checked | int |
| | note | nvarchar(250) |

Fig. 7b

3-4_callCodes

| Ref. | Column Name | Data Type |
|---|---|---|
| 162 | call_code | varchar(10) |
| 160 | solucore_call_code | varchar(4) |
| 166 | company_id | int |
| 182 | part_name | varchar(100) |
| | id | int |

Fig. 7c

Sample of XML string being transmitted from step 60 to step 65

```
<ArrayOfEventInfo xmlns:xsi="http://www.w3.org/2001/XMLSchema-instance"
xmlns:xsd="http://www.w3.org/2001/XMLSchema"
xmlns="http://www.mceinc.com/webservices/">
  <EventInfo>
185 <buildingid>1</buildingid>
186 <rowid>112545</rowid>
187 <manufacturerid>8</manufacturerid>
188 <dipatcherid>3</dispatcherid>
189 <<carid>11</carid>
190 <car>North Parking</car>
192 <carid>11</carid>
193 <date>2014-06-11T16:04:59.33</date>
194 <EventId>805339136</EventId>
195 <floor>P3</floor>
196 <floorid>3</floorid>
    <confirmed>false</confirmed>
    <comment/>
  </EventInfo>
</ArrayOfEventInfo>
```

Fig. 8a

| Data conversion from step 65 to 70 | |
|---|---|
| **Entity from XML string** | **Data Column in BuildingEvents table** |
| buildingid | BuildingId |
| rowid | RowId |
| manufacturerid | ManufacturerId |
| dipatcherid | DispatcherId |
| carid | CarId |
| date | EventDate |
| eventid | EventId |
| floorid | FloorId |
| comment | Comment |

Fig. 8b

BuildingEvents table on step 70

BuildingEvents

| Column Name | Data Type |
|---|---|
| BuildingId | int |
| RowId | bigint |
| DispatcherId | int |
| CarId | smallint |
| FloorId | smallint |
| EventDate | smalldatetime |
| ManufacturerId | int |
| EventId | bigint |
| Comment | nvarchar(255) |

Fig. 8c

```
<?xml version="1.0" encoding="UTF-16"?>
<CallBacksObject xmlns:xsd="http://www.w3.org/2001/XMLSchema"
xmlns:xsi="http://www.w3.org/2001/XMLSchema-instance">
  - <CallBacks xmlns="urn:evolve:services">
    - <CallBack>
        <ContractID>61</ContractID>
        <GovernmentInstallationNumber>85759</GovernmentInstallationNumber>
        <DateTheProblemOccurred>2014-08-12T00:36:00</DateTheProblemOccurred>
        <CallCode>B99</CallCode>
        <CallBackDescription>(B99-ZC1) SOUTH ESC 2 OOS MAKING LOUD NOISE
            C/B/C JOEL INFORM FT ALREADY ON SITE</CallBackDescription>
        <CallBackTime>2014-08-12T00:36:00</CallBackTime>
        <CallBackReporterName>JOEL - SEC @ 4169612311</CallBackReporterName>
        <CallBackStatus>Completed</CallBackStatus>
        <CallBackClosedDate>2014-08-12T14:41:00</CallBackClosedDate>
        <Entrapment>false</Entrapment>
        <DispatchTime>2014-08-12T00:41:00</DispatchTime>
        <MechanicArrivedTime>2014-08-12T14:43:00</MechanicArrivedTime>
        <RepairDescription>BUZZER ON SIDE OF UNIT MAKING NOISE HAD TO TAPE
            IT UP.</RepairDescription>
        <CompletedDate>2014-08-12T14:41:00</CompletedDate>
        <WorkOrderNumber/>
        <InvoiceNumber/>
        <EstimatedCost>0</EstimatedCost>
        <ActualCost>0</ActualCost>
        <DirectiveCode/>
        <DeficiencyNumber/>
        <GovernmentMandatedCode/>
        <Counter>0</Counter>
        <IsBillable>false</IsBillable>
      - <Labours>
        - <Labour>
            <MechanicName>SCOTT GLENN</MechanicName>
            <TicketNumber/>
            <MechanicRank/>
            <RegularWorkingHour>0</RegularWorkingHour>
            <TimeAndHalfWorkingHour>0</TimeAndHalfWorkingHour>
            <OvertimeWorkingHour>0</OvertimeWorkingHour>
            <TravelTime>0</TravelTime>
          - <Parts>
            - <Part>
                <SKU/>
                <OEM/>
                <NonOEM/>
                <PartName>Labour</PartName>
                <Manufacturer/>
                <Quantity>1</Quantity>
                <Description/>
                <Price>0</Price>
```

Fig. 9a

</Part>
- <Part>
<SKU/>
<OEM/>
<NonOEM/>
<PartName>Tape</PartName>
<Manufacturer/>
<Quantity>1</Quantity>
<Description/>
<Price>50</Price>
</Part>
</Parts>
</Labour>
</Labours>
</CallBack>
- <CallBack>
<ContractID>61</ContractID>
<GovernmentInstallationNumber>85761</GovernmentInstallationNumber>
<DateTheProblemOccurred>2014-08-29T00:59:00</DateTheProblemOccurred>
<CallCode>B93</CallCode>
<CallBackDescription>(B93-ZC1) FRI AM-ESC S4-OOS-SHOWING ERR ON SCREEN FT GLENN VERF HE RTS THIS AM / INCORRECTLY UPDTED ETA</CallBackDescription>
<CallBackTime>2014-08-29T00:59:00</CallBackTime>
<CallBackReporterName>SHAMEKA - SEC @ 4169612311</CallBackReporterName>
<CallBackStatus>Completed</CallBackStatus>
<CallBackClosedDate>2014-08-29T00:18:00</CallBackClosedDate>
<Entrapment>false</Entrapment>
<DispatchTime>2014-08-29T06:27:00</DispatchTime>
<MechanicArrivedTime>2014-08-29T13:37:00</MechanicArrivedTime>
<RepairDescription>HANDRAIL SENSOR TRIPPED RESET AND PUT UNIT BACK IN SERVICE.</RepairDescription>
<CompletedDate>2014-08-29T00:18:00</CompletedDate>
<WorkOrderNumber/>
<InvoiceNumber/>
<EstimatedCost>0</EstimatedCost>
<ActualCost>0</ActualCost>
<DirectiveCode/>
<DeficiencyNumber/>
<GovernmentMandatedCode/>
<Counter>0</Counter>
<IsBillable>false</IsBillable>
- <Labours>
- <Labour>
<MechanicName>SCOTT GLENN</MechanicName>
<TicketNumber/>
<MechanicRank/>
<RegularWorkingHour>0</RegularWorkingHour>
<TimeAndHalfWorkingHour>0</TimeAndHalfWorkingHour>

Fig. 9b

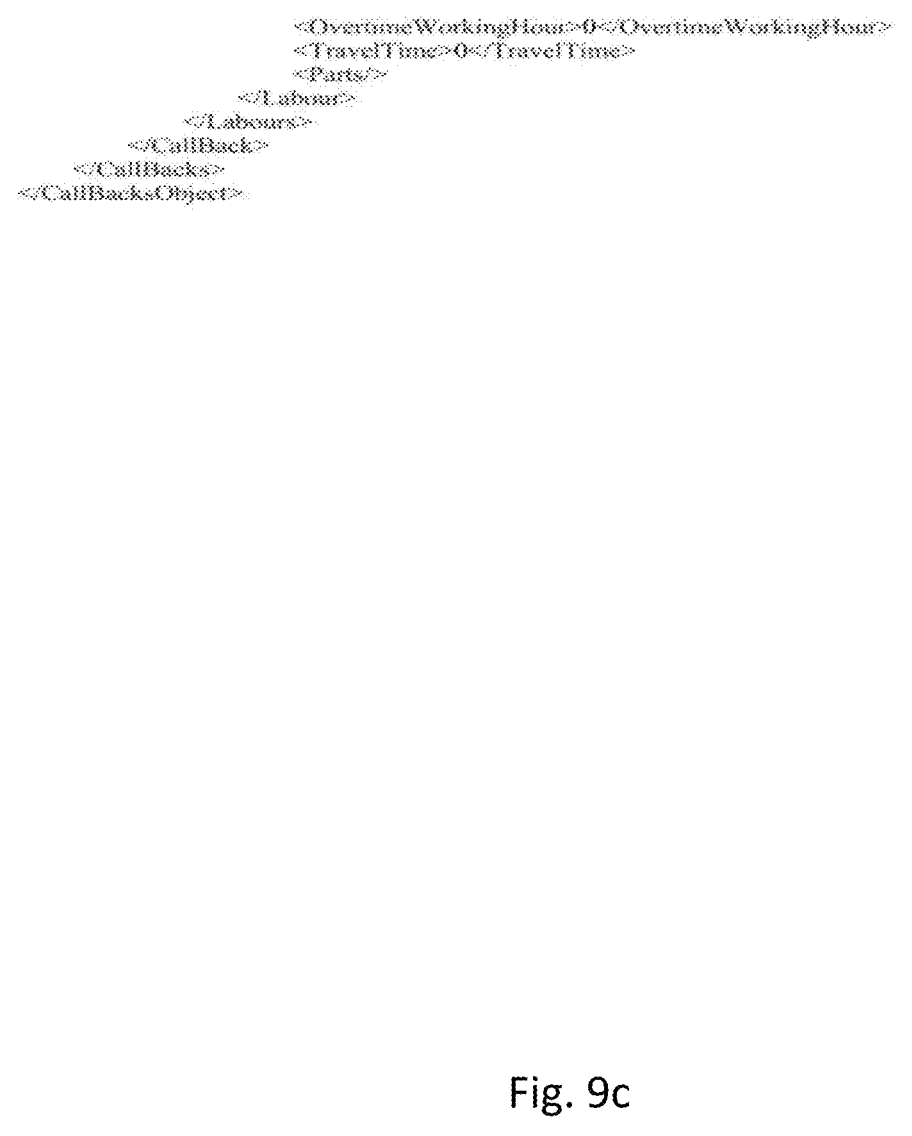

<OvertimeWorkingHour>0</OvertimeWorkingHour>
<TravelTime>0</TravelTime>
<Parts/>
</Labour>
</Labours>
</CallBack>
</CallBacks>
</CallBacksObject>

Fig. 9c

```
<?xml version="1.0" encoding="UTF-8"?>
<ArrayOfTask xmlns:xsi="http://www.w3.org/2001/XMLSchema-instance"
xmlns:xsd="http://www.w3.org/2001/XMLSchema">
 - <Task>
        <TaskID>650275</TaskID>
        <PreviousTaskID/>
        <TaskType>Maintenance</TaskType>
        <Billable>false</Billable>
        <InvoiceNumber/>
        <InvoiceAmount>0</InvoiceAmount>
        <BuildingID>522791</BuildingID>
        <ProvinceCode>ON</ProvinceCode>
        <BuildingName>QUEENSTON MEDICAL DENTAL CNTRE (38THE008-D00114)
            </BuildingName>
        <CallerName/>
        <CallerPhone/>
        <CreationDate>7/3/2014 7:00:00 AM</CreationDate>
        <DispatchedDate/>
        <ArrivalDate/>
        <ClearedDate>8/19/2014 5:41:43 PM</ClearedDate>
        <CustomerIssue>(Customer Not Available)</CustomerIssue>
        <MechanicName>Alovetdinov, Timur</MechanicName>
        <MechanicComments>maintenance.</MechanicComments>
        <Status>Approved</Status>
        <StatusNotes/>
      - <Problems>
          - <Problem>
                <TaskID>650275</TaskID>
                <ProblemLineNumber>1</ProblemLineNumber>
                <AHJNumber>67227</AHJNumber>
                <Entrapment>false</Entrapment>
                <DownTime>0</DownTime>
                <ProblemID>HYD-MANDATORY</ProblemID>
                <ProblemComments>VISIT 3 OF 4</ProblemComments>
                <ResolutionCode>CM</ResolutionCode>
                <ResolutionDescription>Completed Maintenance</ResolutionDescription>
              - <CheckListItems>
                  - <CheckListItem>
                        <TaskID>650275</TaskID>
                        <ProblemLineNumber>1</ProblemLineNumber>
                        <CheckListID>1</CheckListID>
                        <CheckListDescription>HWY</CheckListDescription>
                    </CheckListItem>
                  - <CheckListItem>
                        <TaskID>650275</TaskID>
                        <ProblemLineNumber>1</ProblemLineNumber>
                        <CheckListID>2</CheckListID>
                        <CheckListDescription>MR</CheckListDescription>
                    </CheckListItem>
```

Fig. 10a

- <CheckListItem>
<TaskID>650275</TaskID>
<ProblemLineNumber>1</ProblemLineNumber>
<CheckListID>3</CheckListID>
<CheckListDescription>DAG</CheckListDescription>
</CheckListItem>
- <CheckListItem>
<TaskID>650275</TaskID>
<ProblemLineNumber>1</ProblemLineNumber>
<CheckListID>4</CheckListID>
<CheckListDescription>TOC</CheckListDescription>
</CheckListItem>
- <CheckListItem>
<TaskID>650275</TaskID>
<ProblemLineNumber>1</ProblemLineNumber>
<CheckListID>5</CheckListID>
<CheckListDescription>PIT</CheckListDescription>
</CheckListItem>
</CheckListItems>
</Problem>
</Problems>
- <Debriefs>
- <Debrief>
<TaskID>650275</TaskID>
<DebriefType>LBR</DebriefType>
<DebriefCode>B</DebriefCode>
<Quantity>2</Quantity>
<RegularWorkingHour>0</RegularWorkingHour>
<TimeAndHalfWorkingHour>0</TimeAndHalfWorkingHour>
<OvertimeWorkingHour>0</OvertimeWorkingHour>
<TravelTime>0</TravelTime>
</Debrief>
</Debriefs>
</Task>
- <Task>
<TaskID>802327</TaskID>
<PreviousTaskID/>
<TaskType>Callback</TaskType>
<Billable>true</Billable>
<InvoiceNumber/>
<InvoiceAmount>0</InvoiceAmount>
<BuildingID>507824</BuildingID>
<ProvinceCode>ON</ProvinceCode>
<BuildingName>MRS. CAMERON MONTROSE APTS. (24WIN003 00114)
</BuildingName>
<CallerName>darion</CallerName>
<CallerPhone>519-971-7033</CallerPhone>
<CreationDate>8/13/2014 4:53:01 PM</CreationDate>
<DispatchedDate>8/13/2014 4:54:43 PM</DispatchedDate>

Fig. 10b

<?xml version="1.0"?>
<DATA_ELEMENT>
- <SERVICE_DATA>
<NSA_CD>134</NSA_CD>
<BUILDING_NAME>MANULIFE CTR</BUILDING_NAME>
<STREET_ADDRESS>44 CHARLES ST W</STREET_ADDRESS>
<CITY>TORONTO</CITY>
<PROV>ON</PROV>
<GOVT_NUMBER>021710</GOVT_NUMBER>
<CNTRCT_OFFICE>FT</CNTRCT_OFFICE>
<CNTRCT_NUMBER>05253</CNTRCT_NUMBER>
<MACHINE_NUMBER>971343</MACHINE_NUMBER>
<CALL_TYPE>S</CALL_TYPE>
<CALL_DATE>2014-08-14</CALL_DATE>
<CALL_TIME>19:07</CALL_TIME>
<CALL_COMPLETED_DATE>2014-08-14</CALL_COMPLETED_DATE>
<CALL_COMPLETED_TIME>23:36</CALL_COMPLETED_TIME>
<RESPONSE_TIME>209</RESPONSE_TIME>
<DEFER_IND>N</DEFER_IND>
<CUSTOMER_REPORTED_1>H/R P7 CON ELV, STK B/T 1ST & 31ST FLR, HAD TRAPPED PASS-NOW OUT.</CUSTOMER_REPORTED_1>
<CUSTOMER_REPORTED_2>CUST S/D ELV, OTCB AUTH NOW, ETA NDD</CUSTOMER_REPORTED_2>
<PROB_CD>F01</PROB_CD>
<PROBLEM_DESCRIPTION>HOISTWAY DOORS - INTERLOCK/ELECTRICAL</PROBLEM_DESCRIPTION>
<PERF_DESC>ADJUSTED</PERF_DESC>
<PERF_BY>OTIS</PERF_BY>
<CAR_OCCUPIED>N</CAR_OCCUPIED>
<REG_OT_IND>O</REG_OT_IND>
<CALLER_NAME>SHAMIKA MALCOLM/SEC.</CALLER_NAME>
<MECHANIC_NAME>DOWNEY, BRIAN</MECHANIC_NAME>
<PROCEDURE_DATE/>
<PROCEDURE_CODE/>
<PROCEDURE_DESCRIPTION/>
<MINUTES_WORKED/>
<PROV_GOVT_UNIT>021710</PROV_GOVT_UNIT>
</SERVICE_DATA>
- <SERVICE_DATA>
<NSA_CD>134</NSA_CD>
<BUILDING_NAME>NORTH AMERICAN CENTRE</BUILDING_NAME>
<STREET_ADDRESS>5650 YONGE STREET</STREET_ADDRESS>
<CITY>NORTH YORK</CITY>
<PROV>ON</PROV>
<GOVT_NUMBER>39019</GOVT_NUMBER>
<CNTRCT_OFFICE>FTM</CNTRCT_OFFICE>
<CNTRCT_NUMBER>05705</CNTRCT_NUMBER>
<MACHINE_NUMBER>D98306</MACHINE_NUMBER>
<CALL_TYPE>P</CALL_TYPE>

Fig. 11a

<CALL_DATE/>
<CALL_TIME/>
<CALL_COMPLETED_DATE/>
<CALL_COMPLETED_TIME/>
<RESPONSE_TIME/>
<DEFER_IND/>
<CUSTOMER_REPORTED_1/>
<CUSTOMER_REPORTED_2/>
<PROB_CD/>
<PROBLEM_DESCRIPTION/>
<PERF_DESC/>
<PERF_BY/>
<CAR_OCCUPIED/>
<REG_OT_IND/>
<CALLER_NAME/>
<MECHANIC_NAME>DAVIDSON, GRANT</MECHANIC_NAME>
<PROCEDURE_DATE>09/03/2014</PROCEDURE_DATE>
<PROCEDURE_CODE>990H</PROCEDURE_CODE>
<PROCEDURE_DESCRIPTION>Sched UV Hydro</PROCEDURE_DESCRIPTION>
<MINUTES_WORKED>15</MINUTES_WORKED>
<PROV_GOVT_UNIT>39019</PROV_GOVT_UNIT>
</SERVICE_DATA>
</DATA_ELEMENT>

Fig. 11b

```
                                    SampleDataFromVendor3
<?xml version="1.0" encoding="utf-16"?>
<ArrayOfDT_Notif
xmlns:xsi="http://www.w3.org/2001/XMLSchema-instance"
xmlns:xsd="http://www.w3.org/2001/XMLSchema">
    <DT_Notif>
        <NotifDT>07/12/2014 07:06:55 AM</NotifDT>
        <NotifNum>44144199</NotifNum>
        <Prty>3</Prty>
        <EquipID>T5785621</EquipID>
        <EquipDesc>North ESC 1</EquipDesc>
        <Status>NOTIFICATION CLOSED OUT</Status>
        <IsBillable>N</IsBillable>
        <DsrdDT>07/12/2014 07:06:55 AM</DsrdDT>
        <DispDT>07/12/2014 07:17:34 AM</DispDT>
        <OperDisp />
        <Control />
        <TechID>00501949</TechID>
        <TechName>BRIAN HUNTER</TechName>
        <ArrvDT>07/12/2014 10:28:50 AM</ArrvDT>
        <BISDT>07/12/2014 11:34:41 AM</BISDT>
        <DepDT>07/12/2014 11:34:41 AM</DepDT>
        <CallerName>ALAN- SEC @ 4169612311</CallerName>
        <ProblemDesc>(B93-ZC1) ESC N1- INSRVC- MAKES GRINDING NOISE WHEN
STEPPING ON PLATFORM CLD CUST SHAMEKA W/ETA-GV ETA APRX
9:30</ProblemDesc>
        <Comment />
        <ReptDT>07/12/2014 07:06:55 AM</ReptDT>
        <LongText>ADJUST HANDRAIL TENSION TO REMOVE BUZZING</LongText>
        <WorkOrderNo />
        <CallCode>B93</CallCode>
    </DT_Notif>
    <DT_Notif>
        <NotifDT>07/12/2014 07:08:45 AM</NotifDT>
        <NotifNum>44144201</NotifNum>
        <Prty>3</Prty>
        <EquipID>T5785632</EquipID>
        <EquipDesc>North ESC 2</EquipDesc>
        <Status>NOTIFICATION CLOSED OUT</Status>
        <IsBillable>N</IsBillable>
        <DsrdDT>07/12/2014 07:08:45 AM</DsrdDT>
        <DispDT>07/12/2014 07:24:14 AM</DispDT>
        <OperDisp />
        <Control />
        <TechID>00501949</TechID>
        <TechName>BRIAN HUNTER</TechName>
        <ArrvDT>07/12/2014 09:58:12 AM</ArrvDT>
        <BISDT>07/12/2014 10:27:56 AM</BISDT>
        <DepDT>07/12/2014 10:27:56 AM</DepDT>
        <CallerName>ALAN- SEC @ 4169612311</CallerName>
        <ProblemDesc>(B92-ZC1) ESC N2- INSRVC- MAKES BUZZING NOISE EVERY
FEW MINUTES CLD CUST SHAMEEKA W/ETA-GV ETA APRX 9:30</ProblemDesc>
        <Comment />
                                                            Page 1
```

Fig. 12a

SampleDataFromVendor3

<ReptDT>07/12/2014 07:08:45 AM</ReptDT>
<LongText>LOWER LANDING PLATE GRINDING ON STEP TREADS. RAISED PLATE, TESTED, RTS</LongText>
<WorkOrderNo />
<CallCode>B92</CallCode>
</DT_Notif>
<DT_Notif>
<NotifDT>07/13/2014 01:12:38 PM</NotifDT>
<NotifNum>44154068</NotifNum>
<Prty>3</Prty>
<EquipID>T5785632</EquipID>
<EquipDesc>North ESC 2</EquipDesc>
<Status>NOTIFICATION CLOSED OUT</Status>
<IsBillable>N</IsBillable>
<DsrdDT>07/13/2014 01:12:38 PM</DsrdDT>
<DispDT>07/13/2014 01:19:00 PM</DispDT>
<OperDisp />
<Control />
<TechID>00501949</TechID>
<TechName>BRIAN HUNTER</TechName>
<ArrvDT>07/13/2014 03:04:51 PM</ArrvDT>
<BISDT>07/13/2014 03:35:51 PM</BISDT>
<DepDT>07/13/2014 03:35:51 PM</DepDT>
<CallerName>JERRY-SECURITY @ 4169612311</CallerName>
<ProblemDesc>(B93-ZC1) ESC NORTH 02 CUST S/D BURNING RUBBER SMELL COMING FROM RIGHT HANDRAIL GV JERRY 3:15 PM FT ETA</ProblemDesc>
<Comment />
<ReptDT>07/13/2014 01:12:38 PM</ReptDT>
<LongText>HANDRAIL ADJUSTMENT.</LongText>
<WorkOrderNo />
<CallCode>B93</CallCode>
</DT_Notif>
<DT_Notif>
<NotifDT>07/14/2014 06:48:40 PM</NotifDT>
<NotifNum>44168238</NotifNum>
<Prty>3</Prty>
<EquipID>T5785621</EquipID>
<EquipDesc>North ESC 1</EquipDesc>
<Status>NOTIFICATION CLOSED OUT</Status>
<IsBillable>N</IsBillable>
<DsrdDT>07/14/2014 07:03:00 PM</DsrdDT>
<DispDT>07/14/2014 09:09:37 PM</DispDT>
<OperDisp />
<Control />
<TechID>00500351</TechID>
<TechName>PAUL O'NEILL</TechName>
<ArrvDT>07/14/2014 09:34:27 PM</ArrvDT>
<BISDT />
<DepDT>07/14/2014 10:00:29 PM</DepDT>
<CallerName>JERRY-SECURITY @ 4169612311</CallerName>
<ProblemDesc>(B93-ZC1) ESC 1 CUST SD AFTER BURNNG SMELL CAME FROM HANDRAIL CLD FT ONEILL CELL/ HE WILL PICK UP ON LINK

Fig. 12b

SampleDataFromVendor3

ASAP</ProblemDesc>
<Comment />
<ReptDT>07/14/2014 06:48:40 PM</ReptDT>
<LongText>RAN ESC FOR 25 MINUTES , RIGHT HANDRAIL WAS A LITTLE WARM . SHUT IT DOWN AND LEFT FOR ESC CREW. .</LongText>
<WorkOrderNo />
<CallCode>B93</CallCode>
</DT_Notif>
<DT_Notif>
<NotifDT>07/14/2014 06:49:06 PM</NotifDT>
<NotifNum>44168239</NotifNum>
<Prty>3</Prty>
<EquipID>T5785632</EquipID>
<EquipDesc>North ESC 2</EquipDesc>
<Status>NOTIFICATION CLOSED OUT</Status>
<IsBillable>Y</IsBillable>
<DsrdDT>07/14/2014 07:04:00 PM</DsrdDT>
<DispDT>07/14/2014 09:09:15 PM</DispDT>
<OperDisp />
<Control />
<TechID>00500351</TechID>
<TechName>PAUL O'NEILL</TechName>
<ArrvDT>07/14/2014 10:01:47 PM</ArrvDT>
<BISDT>07/14/2014 10:16:03 PM</BISDT>
<DepDT>07/14/2014 10:16:03 PM</DepDT>
<CallerName>CHRIS SEC @ 4169612311</CallerName>
<ProblemDesc>(B05-ZC7) ESC 2 CUST S/D BURNING SMELL COMING FROM HANDRAIL ADVISED P/C ETA EXPIERD MD OUT</ProblemDesc>
<Comment />
<ReptDT>07/14/2014 06:49:06 PM</ReptDT>
<LongText>ROA</LongText>
<WorkOrderNo>5350250604</WorkOrderNo>
<CallCode>B05</CallCode>
</DT_Notif>
<DT_Notif>
<NotifDT>07/21/2014 06:21:07 AM</NotifDT>
<NotifNum>44233241</NotifNum>
<Prty>3</Prty>
<EquipID>T5231030</EquipID>
<EquipDesc>South ESC 4</EquipDesc>
<Status>NOTIFICATION CLOSED OUT</Status>
<IsBillable>N</IsBillable>
<DsrdDT>07/21/2014 06:21:07 AM</DsrdDT>
<DispDT>07/21/2014 11:20:15 AM</DispDT>
<OperDisp />
<Control />
<TechID>00500761</TechID>
<TechName>SCOTT GLENN</TechName>
<ArrvDT>07/21/2014 11:42:02 AM</ArrvDT>
<BISDT>07/21/2014 11:24:20 AM</BISDT>
<DepDT>07/21/2014 11:24:20 AM</DepDT>
<CallerName>STEVE- SEC @ 4169612311</CallerName>

Page 3

Fig. 12c

METHOD OF RETRIEVING AND UNIFORMALIZING ELEVATOR MAINTENANCE AND CALLBACK DATA AND CODE EVENTS

FIELD

The invention relates to the field of elevator/escalator maintenance data, and in particular, retrieving, uniformalizing and storing maintenance and callback data from service providers and elevating device controllers.

BACKGROUND

Often, facility owners have multiple elevator/escalator service providers that maintain and repair their equipment, which is generally manufactured by various manufacturers. The service provider provides regular maintenance visits on a monthly, quarterly, or annual basis, as well as support in case of emergency ("callback").

Callback is generally initiated by facility owners via calling the service provider. Once initiated, the service provider enters the information into its internal system and dispatches a technician. The information generated from the call and the dispatch becomes a part of the callback history. Facility owners are able to monitor and access the callback history from the service providers website. This is shown in FIG. 1.

Whether facility owners have a single building or multiple buildings, they generally have multiple service providers. With the use of multiple service providers, facility owners are forced to manage multiple accounts in order to access the different web applications from each service provider. Additionally, the various service providers utilize different codes, formats and presentations with respect to their data files. This is shown in FIG. 2. As such, it is a mammoth task to collect and interpret the information from the various service providers, as there is no uniformalization of information storage among the various service providers. To further complicate this situation, service providers' files are not always available, and are typically accessible only on an on-demand basis.

At the conclusion of a contract for services, facility owners may decide not to extend the contract with the service providers depending on multiple factors (e.g., quality of service, new service provider offers, etc.). When the contract between the facility owner and the service provider is terminated, the facility owner no longer has access to data that was stored by the service provider during the contract tenure. As a result, the callback and maintenance history is no longer available to the facility owner.

Since elevators and escalators have become computer controlled, they store elevator codes or events (e.g., information on the heat detectors or landing sensors) in the controller. Unfortunately, elevator/escalator code/event information is stored in a form that is proprietary to each manufacturer, and usage and maintenance data from different manufacturers cannot be compared.

Technicians who service elevators and escalators access the data from the controller and are able to access various statistical data, events of use and the last service intervals from each elevator. From this data, technicians are able to facilitate servicing of the equipment and anticipate problems before they arise.

Currently, the facility owner is able to access the controller's event and code remotely. Generally, the facility owner would install an application to gain remote access to the controller via a remote computer. Due to the direct connection between the controller and the facility owner's computer, the facility owner must be at the computer in order to open and view the event and code from the controller. This is shown in FIG. 3. As a result of the direct connection between the controller and the computer, the facility owner has to manage multiple accounts and computers. Additionally, the facility owner has no backup in case of data failure/disaster recovery. Further, the facility owner has to rely on a technician to analyze the event and code to identify or anticipate problems.

Comparison of maintenance and usage data from various manufacturers is beneficial as it enables streamlining of maintenance procedures and comparison of elevators under different usage circumstances. However, a method of uniformalizing has not been heretofore disclosed in the prior art. Therefore, there is a need to retrieve and uniformalize elevator usage and maintenance data.

SUMMARY

The invention relates to a method for data retrieval and uniformalization of code events data for an elevator, where any number of various service providers transmit code events from an elevator controller to a business partner through a web services application. The business partner retrieves and uniformalizes the data, and then presents the data through a web application. The data is uniformalized by mapping it into the database of the web server with data restrictions, and then converting the data to match those data restrictions. In one embodiment, the business partner can back up the data on a web server. In another embodiment, the data can be XML webservices data and can be retrieved, uniformalized and stored on a datastore.

The invention also discloses another method for data retrieval and uniformalization. In such an embodiment, a service provider stores elevator data and transmits that data to a web services application. A business partner then retrieves that data through the web services application, uniformalizes the data, and then stores the data in a business partner web server. In another embodiment, the data can be data concerning elevator maintenance and service calls. The data is uniformalized by determining a mapping for the data into the database of the web server with data restrictions, and then converting that data to match its restrictions. In a separate embodiment, the data can be XML webservices data and the data can be retrieved, uniformalized and stored on a datastore. In another embodiment, a manufacturer application and API can be installed, where the manufacturer application and API transmit data to the web services application, allowing remote access by the end user. In yet another embodiment, the business partner can back up the stored data on a web server. In another embodiment of the present invention, the business partner may present the uniformalized data through an intuitive web application. The data from more than one elevator can be shown simultaneously in the web application. In yet another embodiment, the user can initiate and control callback by using a web services application, as well as communicate with the service provider through web services to make a call for service. In another embodiment, the business partner can set up web services for mobile applications, which allows mobile communication for the service provider with the business partner's datastore. The end user can then initiate a call using the business partner mobile application, communicating with the service provider through web services that makes a call for service of an elevator. In another embodiment, the end user can control callback by accessing the business partner's web server and initiating a call using a web services application. The web server can have a single sign on. In another embodiment, a standard presentation may display information from one or more service providers. In another embodiment, the web application can analyze datasets, display performance and deficiency information, and send out notifications to a single individual or multiple concerned parties.

DESCRIPTION OF FIGURES

FIG. 6*a* shows a sample dataset, according to an embodiment of the present invention;

FIG. 6*b* shows a sample dataset, according to an embodiment of the present invention;

FIG. 6*c* shows a sample dataset, according to an embodiment of the present invention;

FIG. 7*a* shows a sample dataset, according to an embodiment of the present invention;

FIG. 7*b* shows a sample dataset, according to an embodiment of the present invention;

FIG. 7*c* shows a sample dataset, according to an embodiment of the present invention;

FIG. 8*a* shows a sample of an XML string being transmitted between steps 60 and 65, according to an embodiment of the present invention;

FIG. 8*b* shows the data conversion from step 65 to step 70, according to an embodiment of the present invention;

FIG. 8*c* shows the data types of the Building Events Table, according to an embodiment of the present invention;

FIG. 9*a* shows an example of XML data from Vendors that is used to encapsulate the maintenance history of an elevating device, according to an embodiment of the present invention;

FIG. 9*b* shows an example of XML data from Vendors that is used to encapsulate the maintenance history of an elevating device, according to an embodiment of the present invention;

FIG. 9*c* shows an example of XML data from Vendors that is used to encapsulate the maintenance history of an elevating device, according to an embodiment of the present invention;

FIG. 10*a* shows an example of XML data from Vendors that is used to encapsulate the maintenance history of an elevating device, according to an embodiment of the present invention;

FIG. 10*b* shows an example of XML data from Vendors that is used to encapsulate the maintenance history of an elevating device, according to an embodiment of the present invention;

FIG. 11*a* shows an example of XML data from Vendors that is used to encapsulate the maintenance history of an elevating device, according to an embodiment of the present invention;

FIG. 11*b* shows an example of XML data from Vendors that is used to encapsulate the maintenance history of an elevating device, according to an embodiment of the present invention;

FIG. 12*a* shows an example of XML data from Vendors that is used to encapsulate the maintenance history of an elevating device, according to an embodiment of the present invention;

FIG. 12*b* shows an example of XML data from Vendors that is used to encapsulate the maintenance history of an elevating device, according to an embodiment of the present invention; and FIG. 12*c* shows an example of XML data from Vendors that is used to encapsulate the maintenance history of an elevating device, according to an embodiment of the present invention.

DETAILED DESCRIPTION

Figure 1:
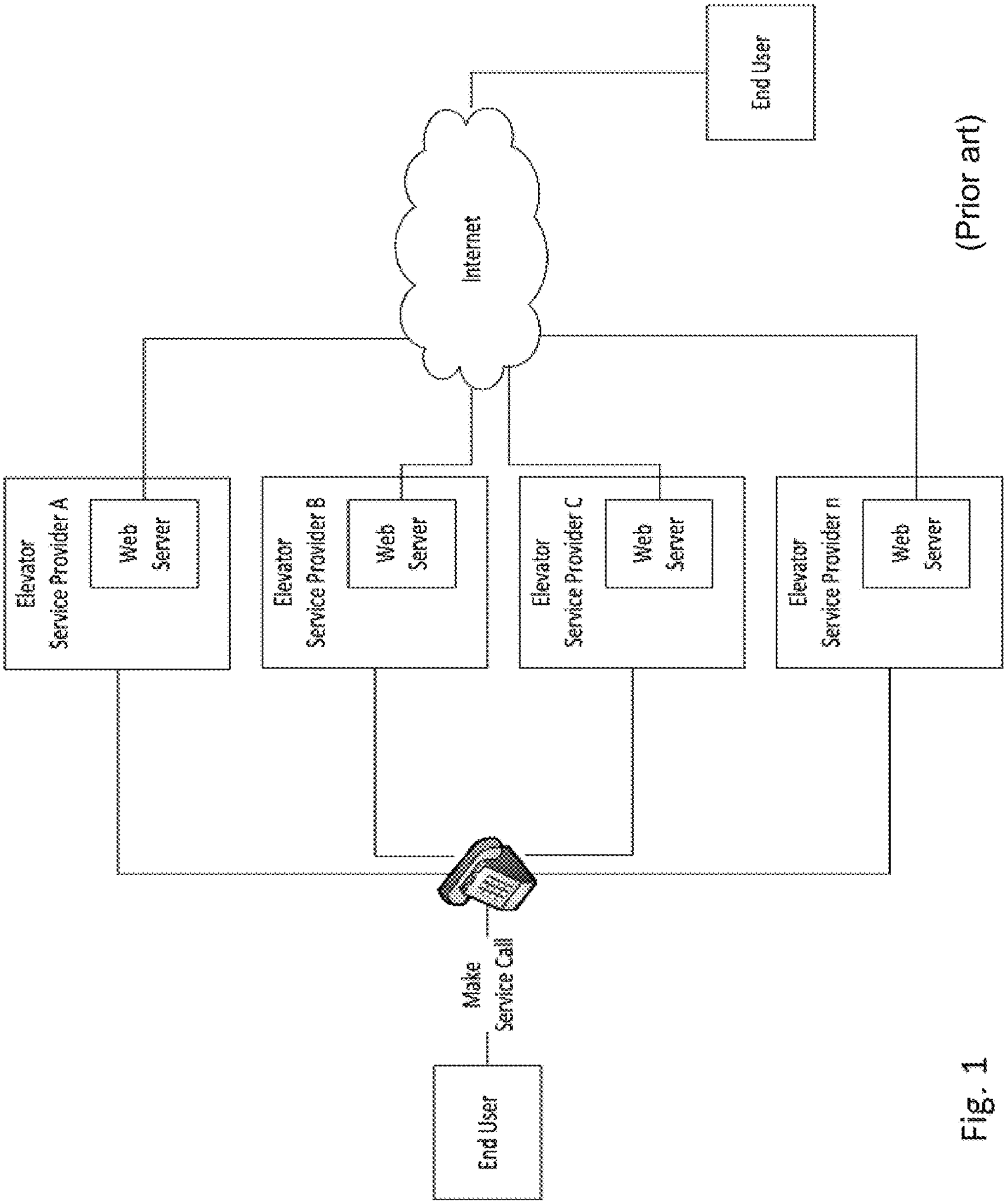
FIG. 1 shows a flowchart of the data retrieval process of the current art in which the end user requests callback by calling individual service providers, according to an embodiment of the present invention.
Figure 2:
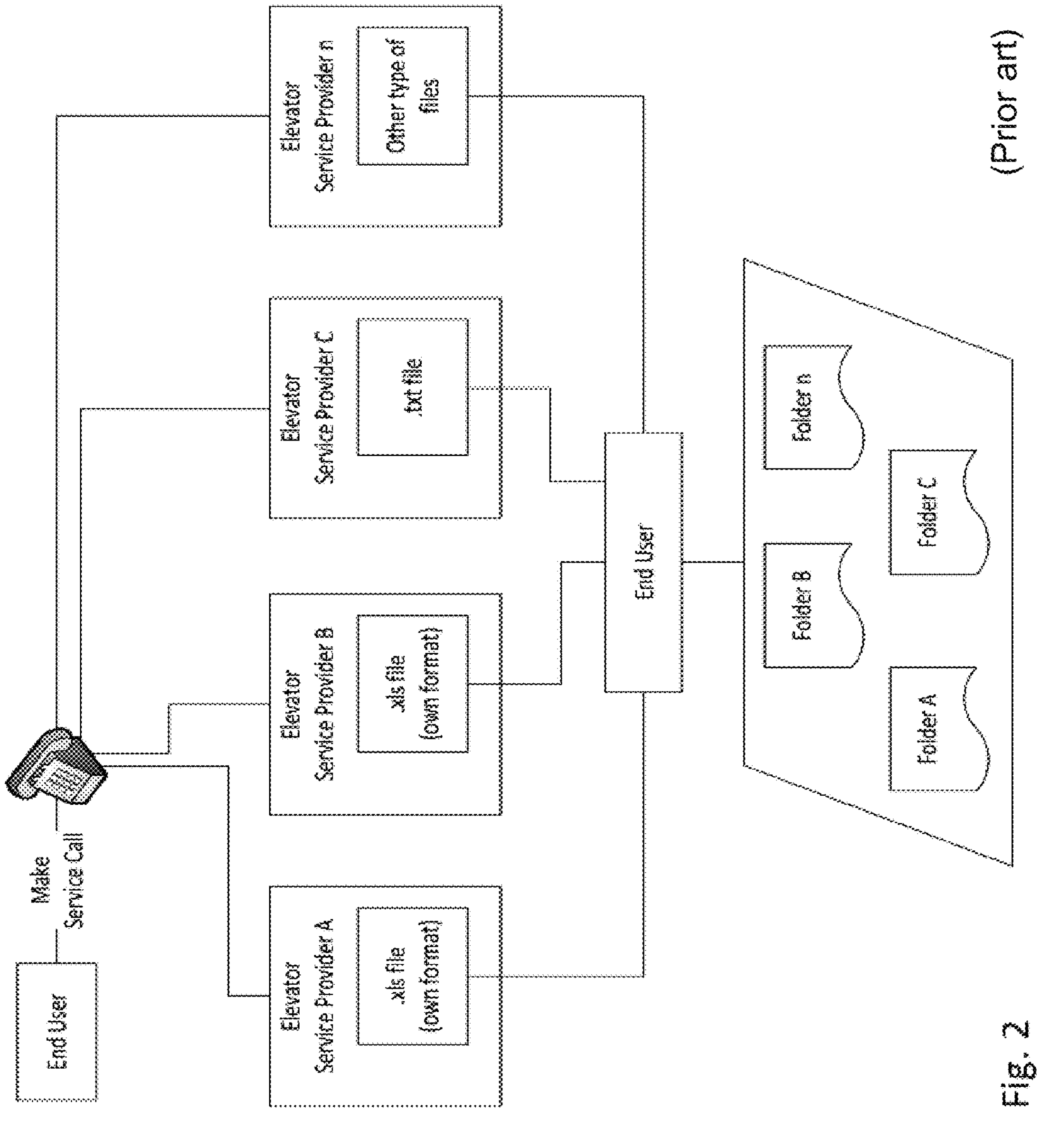
FIG. 2 shows a flowchart of the data retrieval process of the current art as in FIG. 1, further elaborating that the information from service providers are generally in various file types, according to an embodiment of the present invention.
Figure 3:
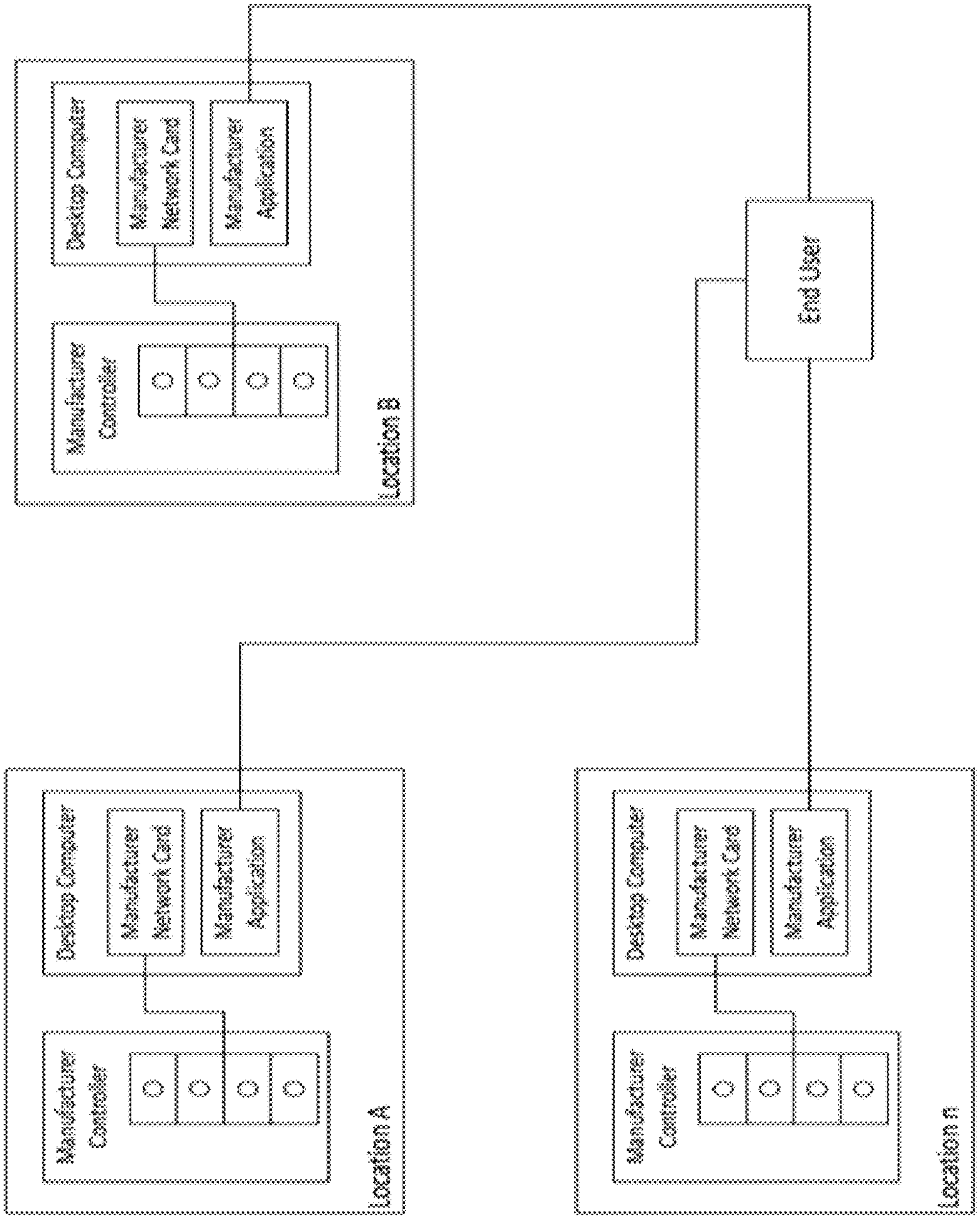
FIG. 3 shows a flowchart of the data retrieval process of the current art directly from the elevator manufacturer controller, according to an embodiment of the present invention.
Figure 4:
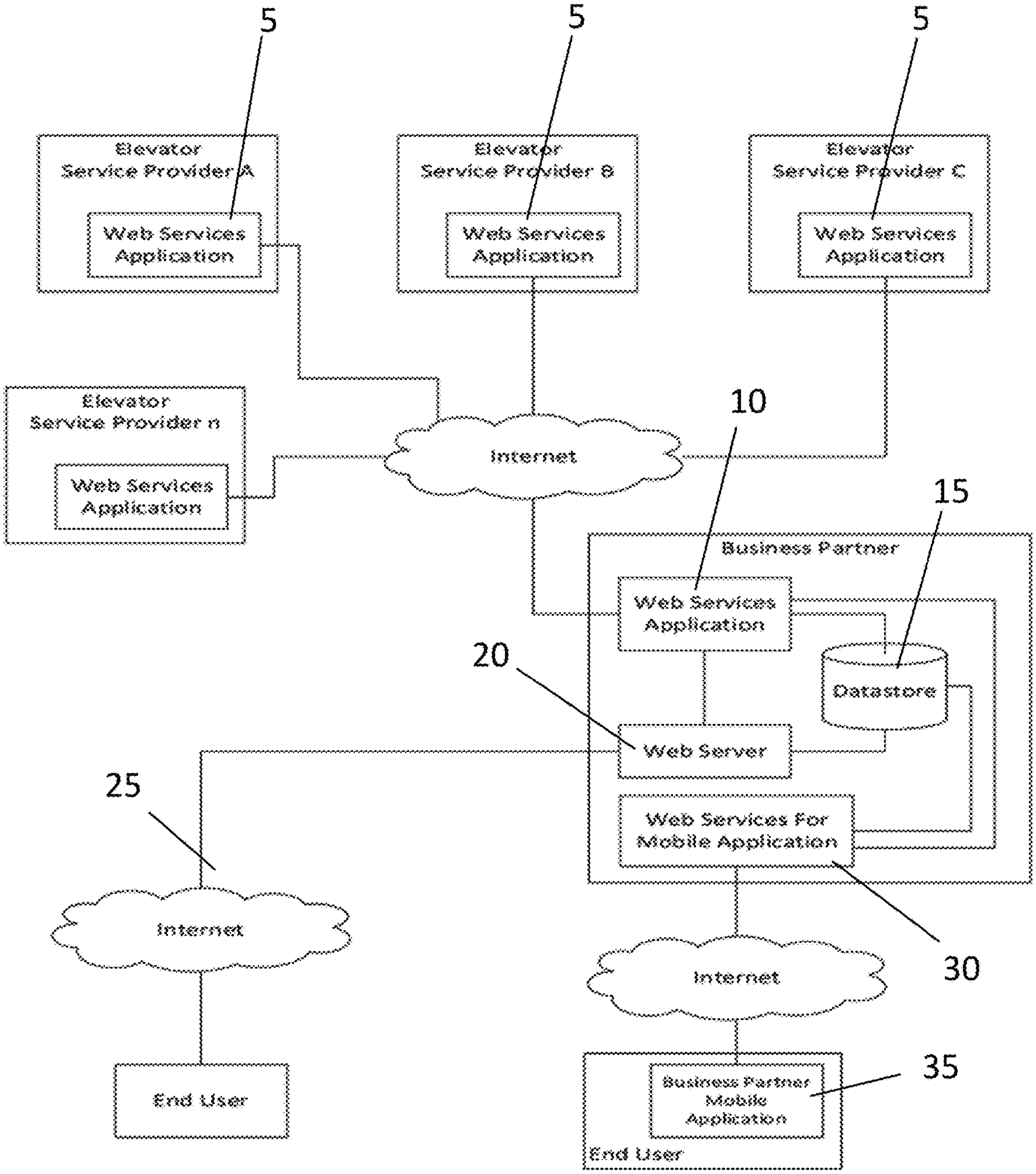
FIG. 4 shows a flowchart of the data retrieval and uniformalization process from the service provider, according to an embodiment of the present invention.

With reference to FIG. 4, an embodiment of the data retrieval and uniformalization process for elevator/escalator (referred to generally as "elevator") maintenance and callback data is described. FIG. 4 relates to service providers that provide maintenance and standby on call service. The service providers perform standard maintenance, and store the maintenance information on the service provider's data storage. Furthermore, the service provider may be called ("service call") by the user to rectify an issue with an elevating device, in which case the service provider will repair the elevator, and again store the service call information on the service provider's data storage. There is therefore information on both i) maintenance and ii) service calls on the service provider's data storage. The service provider has a web application that allows a user to log in and track the information and status of the maintenance and service call completed by the service provider. In step 5 any number of various service providers provide access to the respective service provider's data storage, and transmit that data to the business partner via a web services application, through a network such as the Internet. In step 10 the business partner retrieves the data from the network via a web services application. In step 15 the data is uniformalized and stored in the business partner facility. In the data retrieval and uniformalization process, the information using XML web-services is retrieved, uniformalized and stored on the Datastore. In step 20 the stored data is backed up by the business partner on a web server, and made available to the end user through a web application usable on fixed devices such as computers or mobile devices (e.g., smartphones, tablets and laptop computers). In step 25 the end user gains access to the business partner's web server via the Internet, allowing the end user to initiate and control callback by initiating a call or contact such as email or SMS using a web services application, which then communicates with the service provider system through web services to make a call for service of the elevator. In step 25 the end user may initiate and control callback by initiating a call using a web services application, which then communicates with the correct service provider system through web services to make a call for service of the elevator. The information from all service providers is uniformalized into the Datastore and may be presented intuitively on a web application at step 20. In step 30 a web services for mobile application is set up by the business partner to allow mobile communication for the mobile application with the business partner's Datastore, so that the user may receive operating data at the elevator site or on the road. In step 35 the end user can control callback by initiating a call using business partner mobile application, which then communicates with the service provider system through web services for mobile application.

Figure 5:
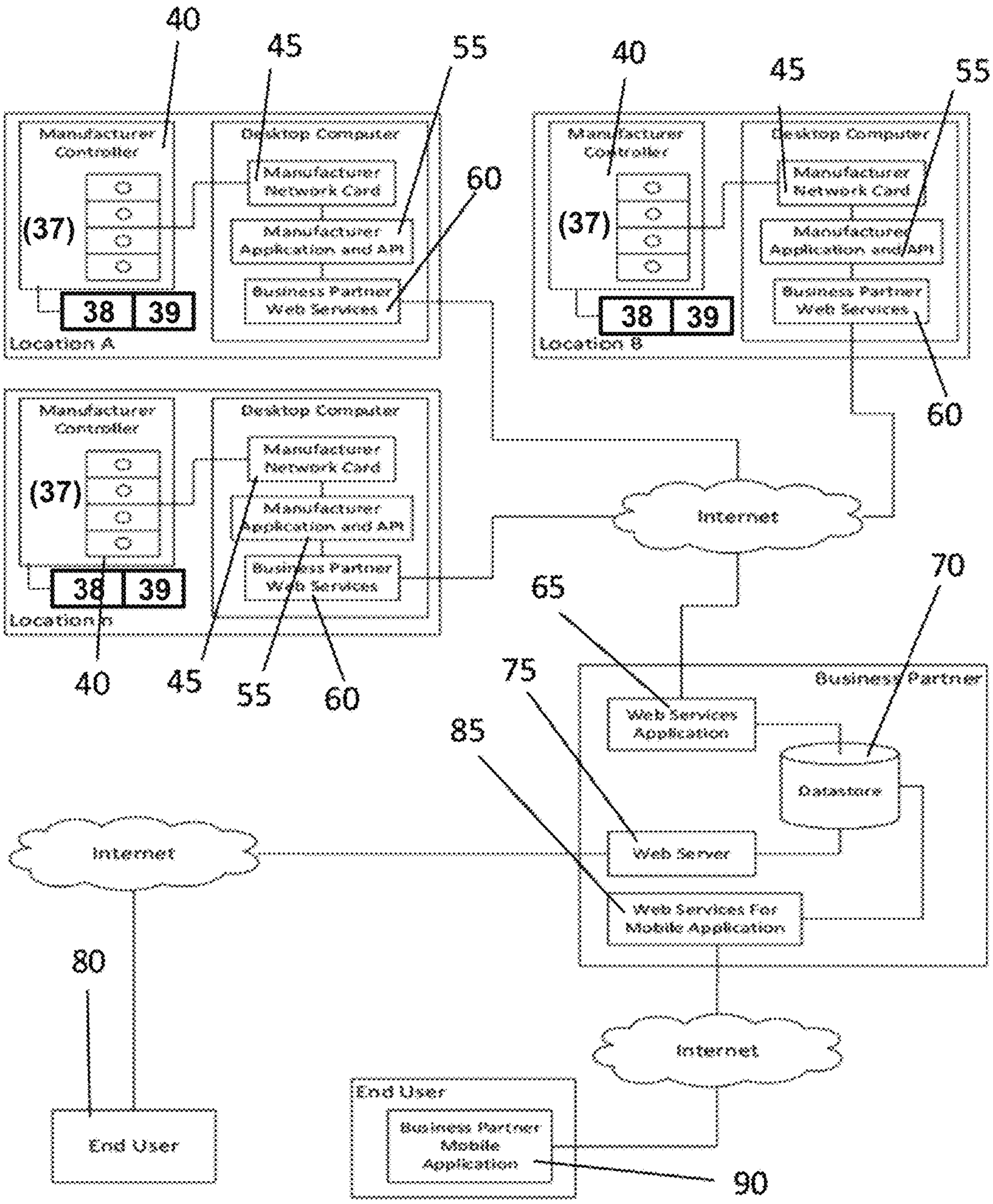
FIG. 5 shows a flowchart of the data retrieval and uniformalization process from the controller, according to an embodiment of the present invention.

With reference to FIG. 5, another embodiment of the data retrieval and uniformalization process is described. FIG. 5 references controllers 37, which are devices built by disparate manufacturers, are installed on the machine room and control the operation of the elevator 38. The controllers 37 collect and store data regarding the performance and service of each of the elevating devices, such as storing code events. Examples of code events are Heat Detectors, Recall Activated, Landing System Sensor Fault and Emergency Power Activated. A user can see events or codes for an elevator 38 from a computer which has a direct connection to the controller 37. The present embodiment receives code events using XML webservices and stores them in the Datastore and uniformalizes them. In step 40 any number of various elevator controllers 37 store code events through its connection with the elevator sensors 39. In step 45 the code events stored in the manufacturer controller is transmitted to a remote computer via a manufacturer network card. In step 55, a manufacturer application and API would generally be installed to allow remote access by the user. In step 60 the manufacturer application and API transmit data to web services application. In step 65 the business partner retrieves the data from the network via the web services application. In step 70 the data is uniformalized and stored in the business partner facility. In step 75, optionally, the stored data is backed up by the business partner on a web server. The uniformalized data may be presented through an intuitive web application. In step 80 the end user gains access to the business partners web server via the Internet, allowing the end user to see data regarding the code events that have been created by an elevator 38. In step 85 a web services for mobile application is set up by the business partner to allow mobile communication with the business partners datastore. In step 90 the business partner mobile application can access the controller code events data through web services.

With reference to FIGS. 6*a-c* and 7*a-c*, sample datasets are shown. In FIG. 6*a*, table Activities contains activities having a unique activity id 102, a company id 104, a location id 106 which is tagged to the location of the elevating device, and a device id 108, to identify a unique elevating device. The maintenance information is stored in the form of work description 110, repair description 112, the entered and completion dates 114, 116 and the work order number 118. The invoicing information may be contained as invoice number 120, estimated cost 122 and actual cost 124. The callback information includes a callback id 123, directive code 125, deficiency number 126, government-mandated code 127, counter 128 for the number of occurrences, and billable 129 that determines whether the hours are billable or not.

In FIG. 6*b*, table Activity Labour contains a unique labour id 130, the name of the mechanic 132, the ticket number 134, the hours spent at various rates per hour (regular hour, half hour, overtime and travel hours) 136, as well as time spent at nonbillable activities 138.

In FIG. 6*c*, table Activity Parts provides information on the parts used for the elevator repair. The part id 140 is a unique identifier, and also includes a SKU number 142, OEM field 144, and the name and manufacturer of the part 146, 148, along with quantity of parts 150, description 152 and price 154.

In FIG. 7*a*, table Callbacks includes callback ID 156 for a unique record ID, device ID 158 to uniquely identify a device, a unique call code 160, call code 162, company callback ID 164, company ID 166, information regarding about the problem that occurred such as who entered the problem 168, the date, time and description of the problem 169, dispatch time 170, the call status 171 (including call status and call close time and date), mechanic arrive time 172, information regarding billable hours 174, as well as other information regarding updates of the system 176 such as who updated it or when the update occurred.

In FIG. 7*b*, table Callback Time contains time 178, callback ID 156, dispatch time 170, and mechanic arrive time 172 to determine the responsiveness of the mechanic's call.

In FIG. 7*c*, table Call Codes contains call code 162, a further call code 160 to map the service provider code with business partner code and uniformalize the data, company ID 166, and part name 182 to produce the call codes.

With reference to FIG. 8*a*, a sample of an XML string being transmitted between steps 60 and 65 is shown. In this example, the XML string transmits data on the building ID 185, which is a unique identifier of the building, row ID 186 of the table, the manufacturer ID 187 of the elevating device, the dispatcher ID 188, the car ID 189, a car name 190 for the elevating device, a date stamp 192, an event ID 193 which uniquely identifies the occurrence, along with the floor 195 where the incident occurred, and whether the event was confirmed 196.

In FIG. 8*b*, data conversion from step 65 to step 70 is depicted, wherein the data from the XML string is uniformalized into tables of the Datastore 70, in this example of the Building Events Table. The buildingid field is placed into the BuildingId field, the manufactureid into the ManufactureId field, and so on.

In FIG. 8*c*, the data types of the Building Events Table is shown. These fields in the table have data restrictions. For example, BuildingId is an integer, while RowId is a big integer, and CarId is a small integer and comment is a 255-character field that can hold various characters. In the data conversion process the data from the XML file is received and entered into the fields within the Datastore's 70 tables, under the restrictions of the various fields of the tables. Fields may be limited in different ways (such as varchar [127] or int [3]), and where the data does not fit, it is truncated or converted before being inserted into the database. For example, varchar [255] will be truncated to fit varchar [127], and a decimal number will be rounded to fit an integer data slot. In this way, the data is uniformalized into a single database. In an embodiment, inconsistencies of the field naming convention between the XML (representing the manufacturer's specification) and the tables of the Datastore 70 are resolved by means of a mapping table, wherein the names used by the XML incoming data are matched to the correct fields of the Datastore 70.

FIGS. 9*a-c*, 10*a-b*, 11*a-b* and 12*a-c* show further examples of XML data from Vendors that is used to encapsulate the maintenance history of an elevating device.

With uniformalization of maintenance and usage data, there is a single sign on. The end user can control callback, allowing the end user to notify different concerned parties, such as owners, service providers, consultants and building tenants, to avoid any unwanted events, as well as send reminders of any kind. Further, uniformalization allows the end user to view information from multiple service providers in one standard presentation, instead of multiple reports in multiple formats. The end user can access information at anytime, providing access to the most recent information on their equipment. Further, information is backed up in the business partner facility. Therefore, the end user can access historical data even after switching service providers. Additionally, backup of data within the business partner's facility provides protection to the end user in the event of a data failure. Having the multiple datasets uniformalized enables the business partner application to analyze datasets, show performance and deficiencies, and send out notifications to the concerned parties.

The invention claimed is:

1. A method for data retrieval and uniformalization of code events data for elevators, comprising:

transmitting code events data from elevator controllers to a business partner by means of a web services application, the code events data comprising elevator performance data that is collected and stored by the elevator controllers in different formats, and the different formats correspond to different types of the elevator controllers;

the business partner retrieving the data and uniformalizing the code events data; and the business partner presenting the code events data by means of a web application;

wherein uniformalizing the code events data comprises:

determining a mapping for the code events data into the database of a web server, wherein the database of the web server has data restrictions; and converting the code events data to match the data restrictions.

2. The method of claim 1 further comprising the step of backing up the code events data on the web server.

3. The method of claim 1 wherein the code events data is xml webservices data and the code events data is retrieved, uniformalized and stored on a Datastore.

4. A method for data retrieval and uniformalization for elevators, comprising:

service providers storing elevator data in different formats, the elevator data comprising elevator performance data and data related to elevator maintenance and service calls, and the different formats corresponding to different types of elevator controllers used to control the elevators;

the service provider transmitting the elevator data to a web services application;

a business partner retrieving said data by means of the web services application;

the business partner uniformalizing the elevator data; and the business partner storing the elevator data in a business partner web server;

wherein uniformalizing the elevator data comprises:

determining a mapping for the elevator data into the database of the web server, wherein the database of the web server has data restrictions; and converting said elevator data to match said data restrictions.

5. The method of claim 4 wherein the data is xml webservices data and the elevator data is retrieved, uniformalized and stored on a Datastore.

6. The method of claim 4 further comprising installing a manufacturer application and API, wherein said manufacturer application and API transmit data to the web services application, allowing remote access by said end user.

7. The method of claim 4 further comprising said business partner backing up the stored data on the web server.

8. The method of claim 4 further comprising the business partner presenting uniformalized data through an intuitive web application.

9. The method of claim 8 wherein the elevator data from more than one elevator are shown simultaneously in the intuitive web application.

10. The method of claim 4 further comprising the steps of:

a user initiating and controlling callback for at least one of the elevators by using the web services application; and the user communicating with the service provider through web services to make a call for service for the at least one of the elevators.

11. The method of claim 4 wherein the business partner setting up web services for mobile applications comprises the steps of:

allowing mobile communication for the service providers with the business partner's datastore;

the end user initiating a call using business partner mobile application, wherein the mobile application communicates with the service providers through web services; and the web services application making a call for service of at least one of the elevators by communicating with at least one of the service providers.

12. The method of claim 4 wherein the end user can control callback by accessing the business partner's web server and initiating a call using the web services application.

13. The method of claim 4 wherein the web server uses a single sign on.

14. The method of claim 4 wherein a standard presentation displays information from the service providers.

15. The method of claim 4 wherein the web services application analyzes datasets, displays performance and deficiency information, and send out notification to one or more concerned parties.

16. A system for data retrieval and uniformalization of code events data for elevators, comprising:

elevator controllers configured to transmit code events to a business partner by means of a web services application, the code events data comprising elevator performance data that is collected and stored by the elevator controllers in different formats, and the different formats correspond to different types of the elevator controllers;

the business partner configured to obtain the code events data and uniformalize the code events data;

the business partner configured to present the code events data by means of a web application; and a web server in communication with the business partner, wherein the business partner is configured to uniformalize the code events data by:

determining a mapping for the code events data into a database of the web server, wherein the database of the web server has data restrictions; and converting the code events data to match the data restrictions.

17. The system of claim 16 wherein the code events data is xml webservices data and the code events data is retrieved, uniformalized and stored on a Datastore.

18. A system for data retrieval and uniformalization for elevators, comprising:

a web server configured to communicate with a business partner and service providers, the web server comprising a web services application that is configured to receive elevator data in different formats from the service providers, the elevator data comprising elevator performance data and data related to elevator maintenance and service calls, the different formats corresponding to different types of elevator controllers used to control the elevators;

the business configured to retrieve said data by means of the web services application;

the business partner configured to uniformalize the elevator data; and the business partner in communication with a business partner web server that stores the elevator data;

wherein the business partner is configured to uniformalize the elevator data by: determining a mapping for the elevator data into a database of the web server, wherein the database of the web server has data restrictions; and converting said elevator data to match said data restrictions.

19. The system of claim 18 wherein the elevator data is xml webservices data and the elevator data is retrieved, uniformalized and stored on a Datastore.

20. The system of claim 18 further comprising a manufacturer application and API, wherein said manufacturer application and API transmit data to the web services application, allowing remote access by an end user.

21. The system of claim 18 further comprising an intuitive web application, and the business partner is configured to present uniformalized data through the intuitive web application.

22. The system of claim 21 wherein the elevator data from more than one elevator are shown simultaneously in the intuitive web application.

23. The system of claim 18 wherein the web services application is configured to initiate and control callback for a user, and the web services application is further configured to facilitate communication between the user and a service provided to make a call for service.

24. The system of claim 18 wherein the business partner is configured to set up web services for mobile applications, which comprises:

allowing mobile communication for the service providers with the business partner's datastore;

the end user initiating a call using a business partner mobile application, wherein the mobile application communicates with the service providers through web services; and the web services application making a call for service of at least one of the elevators by communicating with at least one of the service providers.

25. The system of claim 18 wherein an end user can control callback by accessing the business partner's web server and initiating a call using the web services application.

26. The system of claim 21 wherein the intuitive web application comprises a standard presentation display of information from the service providers.

27. The system of claim 18 wherein the web services application is configured to analyze datasets, display performance and deficiency information, and send out notification to one or more concerned parties.

* * * * *

UNITED STATES PATENT AND TRADEMARK OFFICE
CERTIFICATE OF CORRECTION

PATENT NO. : 9,747,585 B2
APPLICATION NO. : 14/514260
DATED : August 29, 2017
INVENTOR(S) : Ray Eleid and Fransky Halim It is certified that error appears in the above-identified patent and that said Letters Patent is hereby corrected as shown below:

In the Claims

Column 7 Lines 42-62 should be corrected to read:

4. A method for data retrieval and uniformalization for elevators, comprising:

service providers storing elevator data in different formats, the elevator data comprising elevator performance data and data related to elevator maintenance and service calls, and the different formats corresponding to different types of elevator controllers used to control the elevators;

the service provider transmitting the elevator data to a web services application;

a business partner retrieving said data by means of the web services application;

the business partner uniformalizing the elevator data; and the business partner storing the elevator data in a business partner web server;

wherein uniformalizing the elevator data comprises:

determining a mapping for the elevator data into a database of the web server, wherein the database of the web server has data restrictions; and converting said elevator data to match said data restrictions.

Signed and Sealed this
Twenty-seventh Day of February, 2018

Andrei Iancu
*Director of the United States Patent and Trademark Office*